United States Patent Office 3,429,664
Patented Feb. 25, 1969

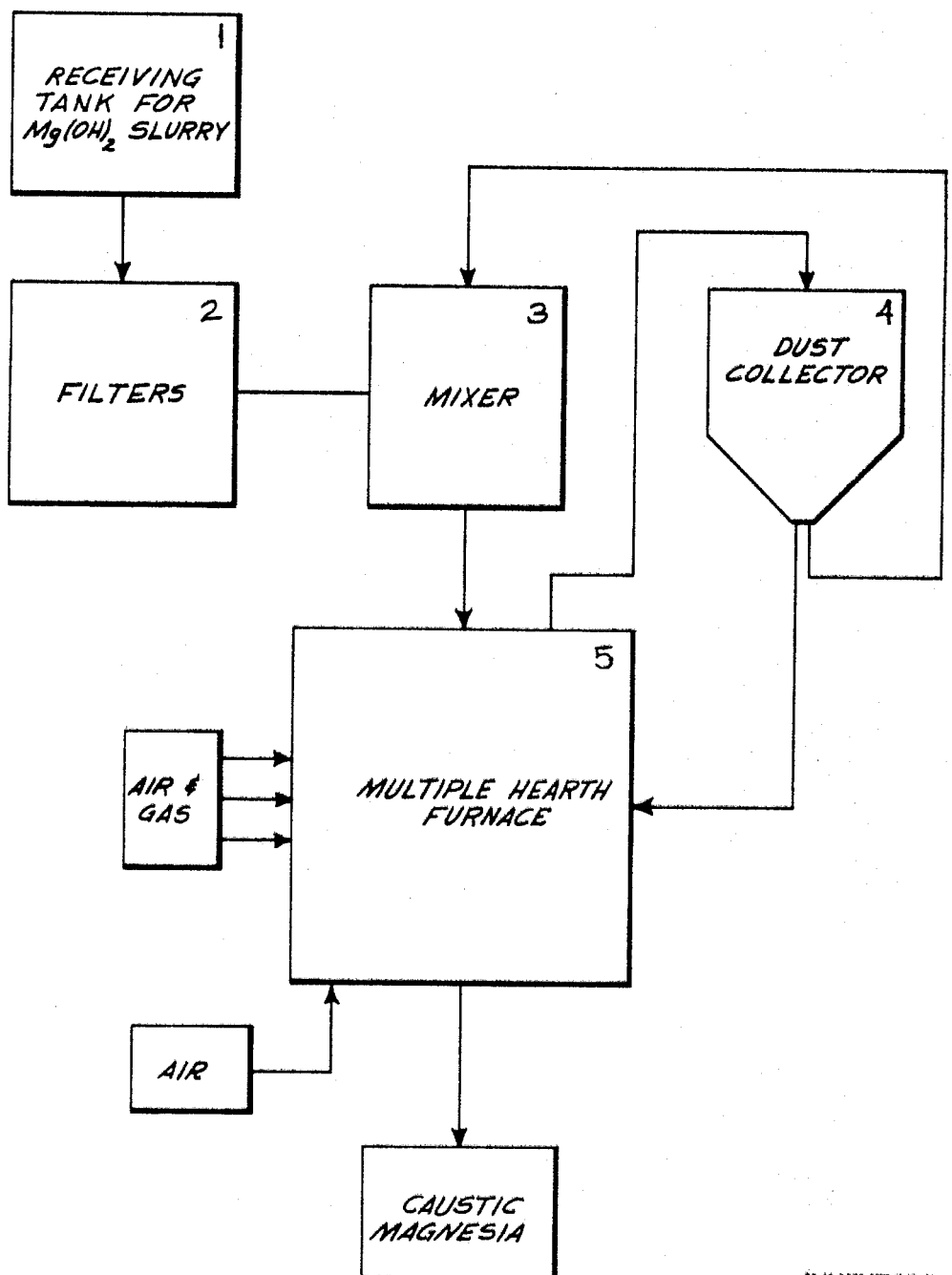

3,429,664
PROCESS FOR THE PRODUCTION OF CAUSTIC CALCINED MAGNESIA
William W. Campbell, Ludington, Mich., and Earl Leatham, Wexford, Pa., assignors to Dresser Industries, Inc., a corporation of Delaware
Filed June 20, 1966, Ser. No. 558,968
U.S. Cl. 23—201   3 Claims
Int. Cl. C01f 5/08; B01d 45/12

ABSTRACT OF THE DISCLOSURE

A process for treating magnesium hydroxide filter cake to produce caustic magnesia, wherein the filter cake is heated in a burning zone and flue gas is removed from the burning zone. Magnesia dust is recovered from the flue gas and then combined with the filter cake to render the filter cake rabbleable.

---

This invention relates to a process for the production of caustic calcined magnesia. More particularly, this invention relates to a process for the production of caustic calcined magnesia in a multiple hearth furnace.

Synthetic refractory grade magnesia is often prepared from sea water and brines by processes such as disclosed in United States Patent No. 3,060,000, assigned to the same assignee as this invention. Generally, high-purity magnesium hydroxide is chemically precipitated from sea water or brines by reaction with calcined lime-containing materials. The fine precipitate is usually in suspension in an aqueous slurry. In continuous processes, the precipitate is removed from the slurry by rotary filters or the like forming a filter cake typically containing about 50% solids. This filter cake is very fluid and sloppy. The filter cake is then given a first burn to drive off free and chemical water and to prepare a "caustic" magnesia of a very reactive nature. Thereafter, the caustic magnesia is briquetted and given a second burn to produce a very dense and nonreactive product of well developed periclase crystallinity, referred to as dead burned magnesia.

This invention is directed primarily to the first burning or caustic calcination step. A feature of this invention is the use of a multiple hearth-type furnace; for example, a Herreshoff furnace of the type shown on page 1622 of the Chemical Engineers' Handbook, Third Edition, published in 1950 by the McGraw-Hill Book Company. These furnaces contain a plurality of hearths in stacked relation, one above the other. The magnesium hydroxide filter cake is fed to the uppermost hearth. Rabbles work the cake over the hearth until it falls through openings provided therein to the next lower hearth. The openings through the hearths are alternately at the edges and at the centers. Burners for introducing fuel and combustion air are placed above almost every hearth. It is normal to operate the multiple hearth furnace with the firing zone, that is the hottest zone, limited to the central or intermediate hearths with the charge being preheated by the exhaust gases on the upper hearths and being cooled by incoming air on the lower hearths. In this way, the exhaust gases leave the top of the furnace and the caustic magnesia leaves the bottom of the furnace at a lower temperature, saving a considerable amount of energy.

Approximately 5 to 7 tons of exhaust gases leave the top of the furnace for every ton of caustic magnesia that leaves the bottom. Therefore, lowering the temperature of the exhaust gases (which includes the combustion gases, the free and chemical water removed from the magnesium hydroxide filter cake, and a large quantity of magnesia dust or carryover) is very effective in conserving energy and, thereby, fuel. In the past, it has been necessary to introduce considerable fuel and combustion air above the uppermost hearth to rapidly remove free water from the sloppy filter cake. In this way a particulate, but not powdery, charge can be produced which is easily moved over the hearth by the rabble arms. Without the burners above the topmost hearth, a rabbleable charge would not develop. Large chunks would form and adhere to the rabble arms blocking the passage over the top hearth of the filter cake. Also, unfortunately, burners over the uppermost hearth raise the temperature of the exhaust gases causing valuable heat energy to be lost.

It is an object of this invention to provide a method of caustic calcining magnesium hydroxide in a multiple hearth-type furnace, wherein the temperature of the exhaust gases are markedly reduced and a more favorable and economic heat balance is achieved.

It must be understood in any known caustic calcining process there is a large quantity of dust created and carried off in the flue gases. This is referred to as "carryover." For economic and health reasons, carryover should not be allowed to escape in the atmosphere. It is generally collected from the flue gases in one of several ways, including centrifugal separation, water-spray precipitation, and electrostatic separation. When water-spray precipitation is used, the retrieved dust is returned to the uppermost hearth of the furnace as a wet sludge. When dry precipitation is used, the dry carryover is returned to the central hearth as a finely divided dust.

Briefly, according to this invention, a process for treating magnesium hydroxide filter cake in a multiple hearth furnace to produce caustic magnesia includes the steps of introducing the filter cake to the multiple hearth furnace on the uppermost hearth, increasing the temperature of the filter cake to about 1800–2000° F. by introducing fuel and air into the furnace and, finally, exhausting the freed water (as vapor) and flue gas from the top of the furnace and recovering the caustic magnesia from the bottom of the furnace. According to this invention, the carryover is collected by one of the dry precipitation processes and thereafter mixed with the filter cake before it is introduced onto the top hearth. This brings the solids content of the filter cake to above 60%, by weight. Since the carryover dust is very reactive, it immediately hydrates on being added to the mixer approximately taking up its own weight in water. So, generally a 5% addition of carryover dust increases the solids content of the cake 10%.

Broadly, this invention consists of a process for burning magnesium hydroxide filter cake to produce caustic magnesia, including the steps of adding magnesia dust removed from the flue gases to the filter cake to raise the solids content thereof to above 60% whereby a rabbleable feed is produced.

Further features and other objects and advantages of this invention should be apparent to one skilled in the art from a study of the following detailed discussion with reference to the drawing, which is a flow diagram schematically showing applicants' process. As shown in the diagram, a magnesium hydroxide-containing slurry is moved from receiving tanks 1, and is filtered either by drum filters or rotary disc filters 2 to produce a filter cake containing typically 50% solids. The filter cake is transferred to a mixer 3, preferably a pugmill, where the dust from the collectors 4 is added to raise the solids content of the filter cake to above about 60% and, preferably, between 60 and 70%, by weight. Thereafter, the filter cake is fed to the uppermost hearth of a multiple hearth furnace 5. Caustic magnesia is recovered from the bottom of the multiple hearth furnace and, thereafter, briquetted and dead burned. The exhaust from the multiple hearth burner, which includes flue gases and magnesia carryover, is passed through some type of dry collector or precipitator 4 to remove the fine magnesia carryover for eventual recycle. Since not all of the carryover dust can be added to the filter cake, some are added back to the furnace at a central hearth.

As mentioned above, a preferable mixer is a pugmill. It provides a chopping and kneading action necessary to mix the fine carryover dust with the filter cake. Other mixers (for example, screw conveyors) do not provide this mixing action required to form a thick paste, but only form a sloppy paste containing large dry lumps.

There appears to be a limit to the amount of carryover that can be returned to the mixer. As the solids content of the cake increases, mixing becomes increasingly difficult. Beyond about 80% solids is unworkable.

In a specific example of the prior practice, about 18 tons of filter cake (about 55% solids) per hour is fed to the uppermost hearth of a multiple hearth-type furnace. About 7 tons of caustic magnesia is recovered per hour with about 2.5 tons of magnesia carryover escaping with the flue gas. The carryover is returned in dry form to the centrally located hearth. About 70,000 cubic feet per hour of natural gas is required to raise the temperature of the feed on the central hearths to above about 1800° F. The total weight of the combustion products, the water removed from the filter cake, and the magnesia carryover leaving the top of the furnace in an hour is approximately 48 tons.

According to this invention, at least one-half of the magnesia carryover is remixed with the filter cake. So, the solids content, that is the $Mg(OH)_2$, in the filter cake is increased to about 69%. It is then a rabbleable feed, and the burners on the uppermost hearths can be removed. The exhaust gas temperature is thereby reduced to about 300° F. Since the average specific heat of the exhaust materials from 550 to 850° F. is 0.332 B.t.u.'s per lb. ° F., the heat saving is easily calculated. The heat saving amounts to approximately 1,300,000 B.t.u.'s per ton of caustic magnesia. This amounts to a fuel saving of about 15%.

The various steps outlined above cooperate with each other in several ways to provide an improved process. For example, dry precipitation of flue dust enables raising the solids content of the filter cake and ultimately resulting in lower flue gas temperatures. The lower flue gas temperature, in turn, improves the dry precipitation process. Dry precipitation has the advantages over wet precipitation in that no water added to the carryover in the recovery rocess is added to the furnace. By mixing the carryover with the filter cake, the total amount of the carryover is reduced.

The dry dust returned to central hearths is easily swept into the air stream. When it is combined with the filter cake, there is an agglomerating effect holding the dust out of the air stream. The carryover is reduced for another reason. The amount of water removed from the feed on the uppermost hearth by the vaporization of free water is reduced and more water is released by dissociation of the hydroxide on lower hearths. The cake thereby tends to remain agglomerated until it is farther down in the furnace where the air speeds are slower and less able to sweep away dust. The primary advantage of this invention is the fuel cost savings resulting from the reduction of the flue gases and the temperature at which they escape from the furnace.

Having thus described the invention in detail and with sufficient particularity as to enable those skilled in the art to practice it, what is desired to have protected by Letters Patent is set forth in the following claims.

We claim:

1. In a process for treating magnesium hydroxide filter cake to produce caustic magnesia comprising the filter cake in a heating zone at a temperature of at least 1800° F. and removing flue gas from said burning zone, the improvement comprising removing magnesia dust from said flue gas and rendering the filter cake rabbleable by combining said removed magnesia dust with said filter cake to produce caustic magnesia comprising burning the filter cake in a heating zone at a temperature of at least above about 60%, by weight, before said burning of said filter cake.

2. The process according to claim 1 in which the solids content of the filter cake is between about 60 and 70%.

3. In the process for treating magnesium hydroxide filter cake in a multiple hearth-type furnace to produce caustic magnesia comprising the steps of:
   (1) introducing the filter cake into a multiple hearth furnace,
   (2) bringing the temperature to above about 1800° F. by introducing fuel and air into the furnace,
   (3) exhausting the free water and flue gas from the top of the furnace,
   (4) recovering the caustic magnesia,
   (5) recovering the magnesia dust carried off in the flue gases by one of the dry precipitation processes, the improvement comprising:
   (6) mixing the magnesia dust with the filter cake to bring the solids content of the filter cake to above about 60%, said cake being a uniform, thick paste, and,
   (7) adding the fuel and combustion air in the centrally located hearths only, whereby the temperature of the flue gas is reduced.

References Cited

UNITED STATES PATENTS

| | | | |
|---|---|---|---|
| 2,478,593 | 8/1949 | Pike | 23—201 |
| 2,640,759 | 6/1953 | Hughey | 23—201 |
| 3,060,000 | 10/1962 | Snyder et al. | 23—201 |
| 3,357,793 | 12/1967 | Hanway et al. | 23—201 X |

OSCAR R. VERTIZ, *Primary Examiner.*

G. T. OZAKI, *Assistant Examiner.*

UNITED STATES PATENT OFFICE
CERTIFICATE OF CORRECTION

Patent No. 3,429,664

February 25, 1969

William W. Campbell et al.

It is certified that error appears in the above identified patent and that said Letters Patent are hereby corrected as shown below:

Column 4, line 14, after "comprising" insert -- burning --; lines 20 and 21, "produce caustic magnesia comprising burning the filter cake in a heating zone at a temperature of at least" should read -- form a uniform thick paste with solid content --.

Signed and sealed this 24th day of March 1970.

(SEAL)
Attest:

Edward M. Fletcher, Jr.

Attesting Officer

WILLIAM E. SCHUYLER, JF

Commissioner of Patents